(12) United States Patent
Kacines

(10) Patent No.: US 6,968,208 B2
(45) Date of Patent: Nov. 22, 2005

(54) DATA STORAGE FOR A PORTABLE COMPUTER DEVICE

(75) Inventor: Jeffrey J. Kacines, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 423 days.

(21) Appl. No.: 10/304,474

(22) Filed: Nov. 26, 2002

(65) Prior Publication Data

US 2004/0102217 A1 May 27, 2004

(51) Int. Cl.[7] .............................. H04B 1/38; H04M 1/00
(52) U.S. Cl. .................... 455/557; 455/41.2; 455/41.3; 455/553.1; 455/419; 710/303; 361/686
(58) Field of Search ................................ 455/418, 419, 455/420, 41.2, 41.3, 553.1, 557; 710/303; 361/686; 711/115

(56) References Cited

U.S. PATENT DOCUMENTS

| | | | | |
|---|---|---|---|---|
| 5,559,501 A | * | 9/1996 | Barzegar et al. | 340/825 |
| 5,621,890 A | * | 4/1997 | Notarianni et al. | 710/303 |
| 5,689,654 A | * | 11/1997 | Kikinis et al. | 710/303 |
| 5,828,862 A | * | 10/1998 | Singkornrat et al. | 711/115 |
| 6,489,932 B1 | * | 12/2002 | Chitturi et al. | 345/30 |
| 6,525,932 B1 | * | 2/2003 | Ohnishi et al. | 361/686 |
| 6,717,801 B1 | * | 4/2004 | Castell et al. | 361/683 |
| 6,769,991 B2 | * | 8/2004 | Fields | 463/43 |

* cited by examiner

Primary Examiner—Stephen D'Agosta
(74) Attorney, Agent, or Firm—J. Dennis Moore; W. James Brady, III; Frederick J. Telecky, Jr.

(57) ABSTRACT

A system for loading data into a module to be used with a portable computer device and the data in the module activated by a wireless connection or from instructions from the teacher. The module may be part of a rechargeable battery pack that includes data storage, or a wireless communications module that is connected to the portable computer device. In an embodiment, the data module is incorporated into a rechargeable battery pack. Data to be sent to the wireless device is transferred via a wired connection first from the charging bay to the battery pack and then from the battery pack to the wireless device when the battery pack is attached.

12 Claims, 3 Drawing Sheets

DATA STORAGE FOR A PORTABLE COMPUTER DEVICE

TECHNICAL FIELD OF THE INVENTION

This invention relates to portable electronic computing devices, and more particularly to a system for loading data into a module to be used with a portable computer device. The module may be part of a rechargeable battery pack that includes data storage, or a wireless communications module that is connected to the portable computer device.

BACKGROUND OF THE INVENTION

A portable computer device such as a hand-held calculator can store relatively large amounts of data. Transferring the data to/from the portable device either requires a high data rate or more time on a slower connection. A wired transfer is desirable for a large data transfer because wired connections typically have a higher data rate but it is not always practical to use a wired connection.

In the classroom environment, a wired connection would be preferable to download large data sets to the hand-held device, but wired connections are not always practical or convenient. A wireless connection is more practical but in many cases too slow for a larger data set. Further, some hand-held devices may not have a dedicated or permanent wireless connection.

SUMMARY OF THE INVENTION

The present invention provides a module having data storage that is loaded with data while connected to a host computer with a high speed wired connection. The module can then be connected to the hand-held or other wireless device. Access to the data on the module is given to the hand-held device over a wireless connection from the host system.

In an embodiment, the data module is incorporated into a rechargeable battery pack. Data to be sent to the wireless device is transferred via a wired connection first from the charging bay to the battery pack and then from the battery pack to the wireless device when the battery pack is attached.

In another embodiment, the data module is incorporated into a wireless module for attachment to a non-wireless hand-held device such as a calculator. Data to be sent to the calculator is transferred via a wired connection first from the charging bay to the wireless module and then to the calculator when the wireless module is attached.

In another embodiment, the data module is a memory card such as a memory stick or smart card which can be inserted or read by a wireless device such as a calculator. Data to be sent to the calculator is transferred via a wired connection first from a programming bay to the memory card and then to the calculator when the memory card is installed or connected. Access to the memory card is enabled over the wireless connection from a host computer.

An advantage for some embodiments of the present invention is that data sent from the students to the teacher or between students over the wireless connection is fairly small in size (e.g. a screen snapshot, answers to multiple choice questions, an equation), while large data sets such as programs, lessons or tests can be downloaded to the modules prior to class while in the charging bay. Using smaller data sets sent over the wireless link allows better performance from less expensive radios and circuits to receive and process the data.

Another advantage for an embodiment is that students can turn in homework by placing "their" wireless accessory module onto the charging bay.

Another advantage for some embodiments is less security issues. Sensitive data that isn't to be shared between students such as homework, tests, quizzes, etc. can be collected securely by turning in the units instead of transmitting it wirelessly. In addition, if a student has his calculator filled with games or sensitive material that he doesn't want the teacher to see, he can download this data to the clip-on device if room needs to be made for the lesson plan. The data never has to be sent to the teacher workstation since it can reside securely in the wireless module, battery pack or memory module.

Another advantage for some embodiments is handling of a new entry such as a student that is tardy. The teacher does not have to stop class to re-transmit the lesson plan. The lesson plan would already reside in the module.

Another advantage for some embodiments is Network reliability is significantly improved. Placing the teacher's lesson plan on the wireless accessories or clip-ons prior to class significantly reduces the amount of wireless traffic required which improves the reliability of the network. In addition, there is less dependency on the computer during class time.

Another advantage for some embodiments is power consumption is reduced. Reducing the amount of time the transmitters and receivers need to be on can prolong battery life on the wireless or hand-held device.

DETAILED DESCRIPTION OF THE INVENTION

Figure 1:
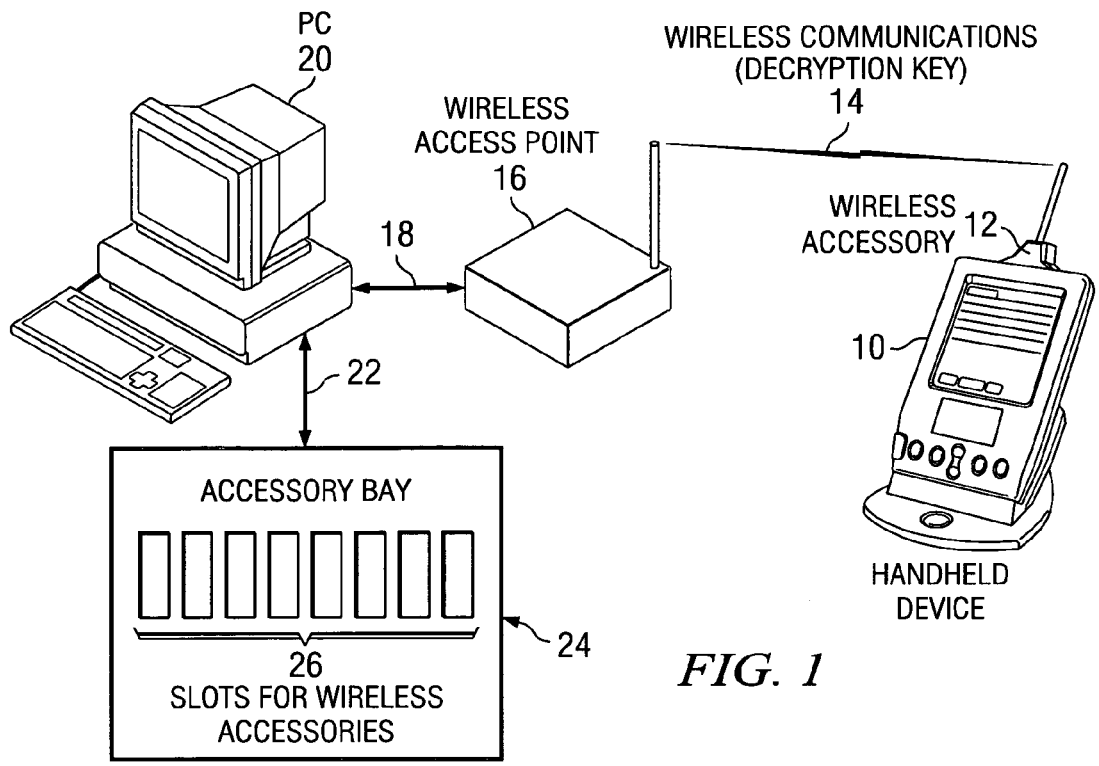
FIG. 1 illustrates a system block diagram according to an embodiment of the present invention.

A first embodiment of the present invention is illustrated in the block diagram shown in FIG. 1. A portable or hand-held computer device 10 incorporates a wireless accessory 12. The computer device 10 communicates over a wireless link 14 to a wireless access point 16. The wireless access point 16 is connected with a wire link 18 to a personal computer (PC) 20. The PC also has a wired connection 22 to a smart charging bay 24. The accessory bay 24 has slots 26 for holding one or more wireless accessories 10 while making a connection from the PC to the wireless accessories in the bay as described below.

Several of the blocks in FIG. 1 are commonly known in the prior art. The PC could be any standard computer with I/O interface capability. The wired interfaces 18, 22 could be implemented with a standard bus such as Ethernet, USB or 1394 bus. The wireless access point 16 could be implemented with a commercially available solution to implement a wireless connection 14 such as Bluetooth. The portable or hand-held computer 10 could be implemented with a calculator, PDA or other portable computer device. The accessory bay and wireless accessory for this embodiment are described further below.

Figure 2:
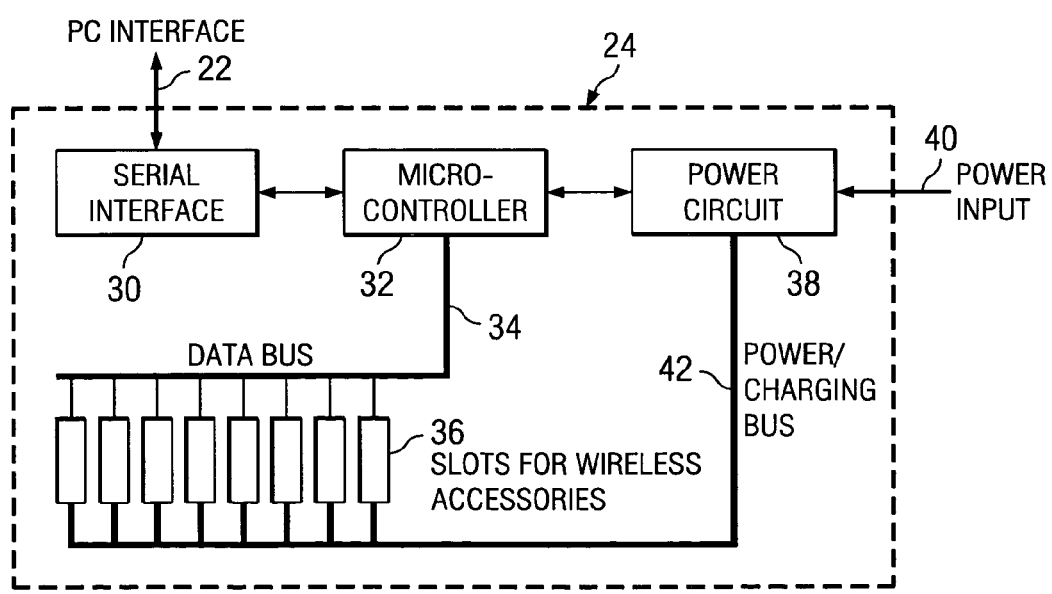
FIG. 2 illustrates a block diagram of the accessory bay according to an embodiment of the present invention.

FIG. 2 shows a block diagram of the smart charging bay 24. The accessory bay 24 combines a data interface and a charging capability to wireless accessories. The charging bay has a serial interface engine 30 to interface the charging bay to the PC over a wired connection 22. The serial interface is connected to a micro-controller 32 which controls the operation of the charging bay. The micro-controller controls a data bus 34 which connects to charging slots 36. The micro-controller also is connected to and provides control of a power circuit 38. The power circuit receives input power from a power input 40 and provides a charging current over a charging bus 42 to the charging slots 36.

Figure 3:
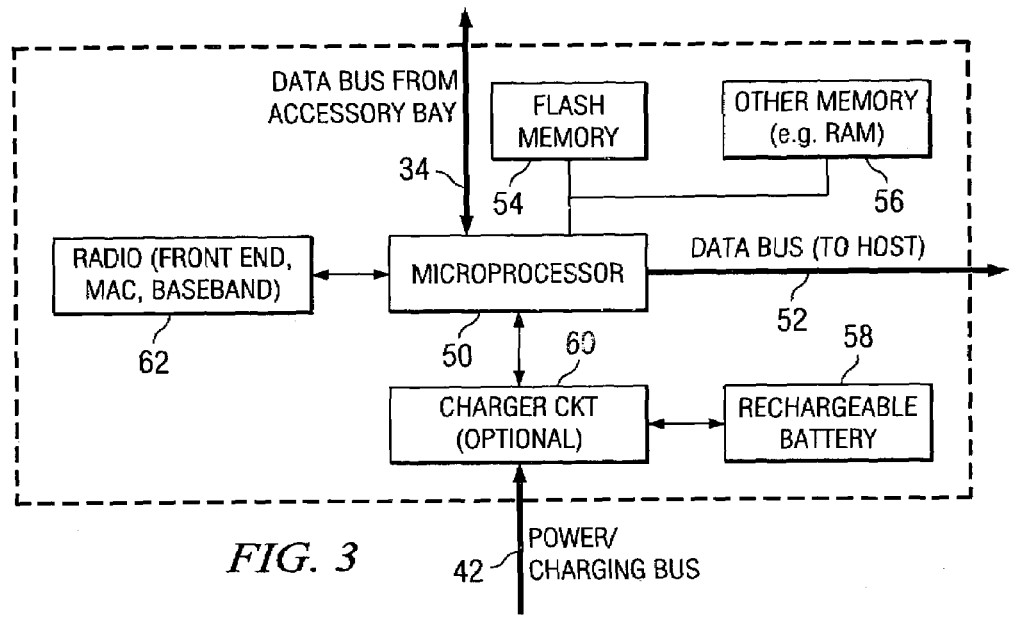
FIG. 3 illustrates a block diagram of a wireless accessory according to an embodiment of the present invention.

FIG. 3 illustrates a wireless accessory according to a preferred embodiment. In this embodiment, the wireless accessory 12 is a module that includes a battery, memory and wireless radio circuit to be coupled with a portable computer device 10 such as a calculator or PDA. The portable computer in this embodiment without the wireless accessory is not capable of wireless communication. The wireless accessory 12 has a microprocessor 50 or a mircrocontroller to control operation. The microprocessor communicates over data bus 34 with the accessory bay 24. As described above, this data bus 34 receives data from the PC over a high speed interface connected to the accessory bay. The microprocessor has another data bus 52 to communicate with the host computer or processor of the portable computer device 10. The wireless accessory has memory such as flash memory 54, and could have other memory storage such as ram memory 56. Data to be transferred from the PC to the portable computer is stored in memory until the wireless accessory is connected to the portable computer.

The wireless accessory in the preferred embodiment shown in FIG. 3 also has a rechargeable battery 58 connected to a charger circuit 60 controlled by the microprocessor. Power for charging the battery, and in some embodiments, control for the charging comes from the accessory bay over power/charging bus 42. The wireless accessory in the preferred embodiment further has a radio circuit 62 to communicate with the PC over a wireless link 14 to a wireless access point 16 as shown in FIG. 1.

Data, such as a lesson plan, test, etc. is loaded to the Flash memory of the Wireless Accessory in the Smart Charging Bay. However, the contents of the memory is not accessible from the Handheld Device until a wireless command is received enabling access. In one embodiment, this is achieved by having the contents encrypted. In order to access the contents, a wireless command is sent from the PC that includes the section of memory to decrypt along with a decryption key. The portable computer device can then use the key to decrypt the data and present the lesson plan, test question, etc. to the user. There can be one key assigned to all of the contents or multiple keys for access to subsets of data such as a particular test question or the next section in a lesson plan.

In the previous embodiment, the memory is incorporated into a wireless accessory with a rechargeable battery pack for attachment to a non-wireless hand-held device such as a calculator. Data to be sent to the calculator is transferred via a wired connection first from the charging bay to the wireless module and then to the calculator when the wireless module is attached. In another embodiment, the data module is incorporated into wireless accessory without a rechargeable battery. Just as in the above embodiment, data to be sent to the wireless device is transferred via a wired connection first from the charging bay to the battery pack and then from the battery pack to the wireless device when the wireless accessory is attached to the wireless device.

Figure 4:
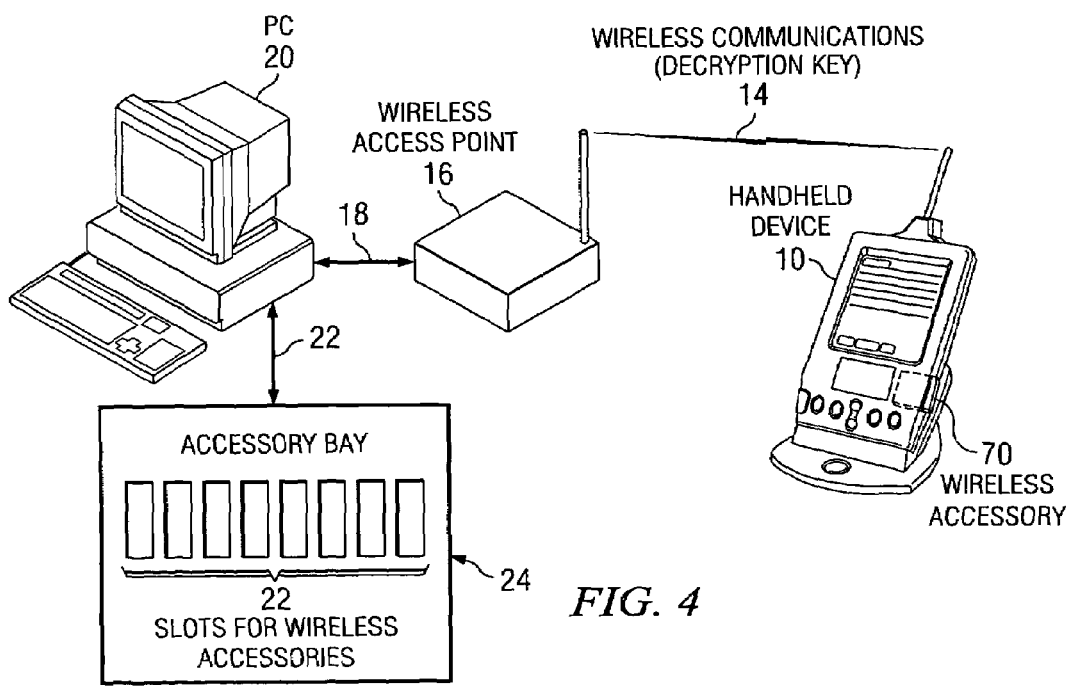
FIG. 4 illustrates a block diagram of another embodiment of the present invention.

Another embodiment of the present invention is shown in FIG. 4. This embodiment is similar to the embodiment of FIG. 1, except the wireless accessory 70 is a memory card connected to a wireless handheld device 10. The wireless accessory or memory card can be implemented with know memory cards such as a memory stick or smart card. The memory card can be inserted and read by the wireless handheld device or calculator 10. Data to be sent to the calculator is transferred via a wired connection first from an accessory bay 24 to the memory card and then to the calculator when the memory card is installed or connected. Access to the memory card is enabled over the wireless connection from a host computer.

Figure 5:
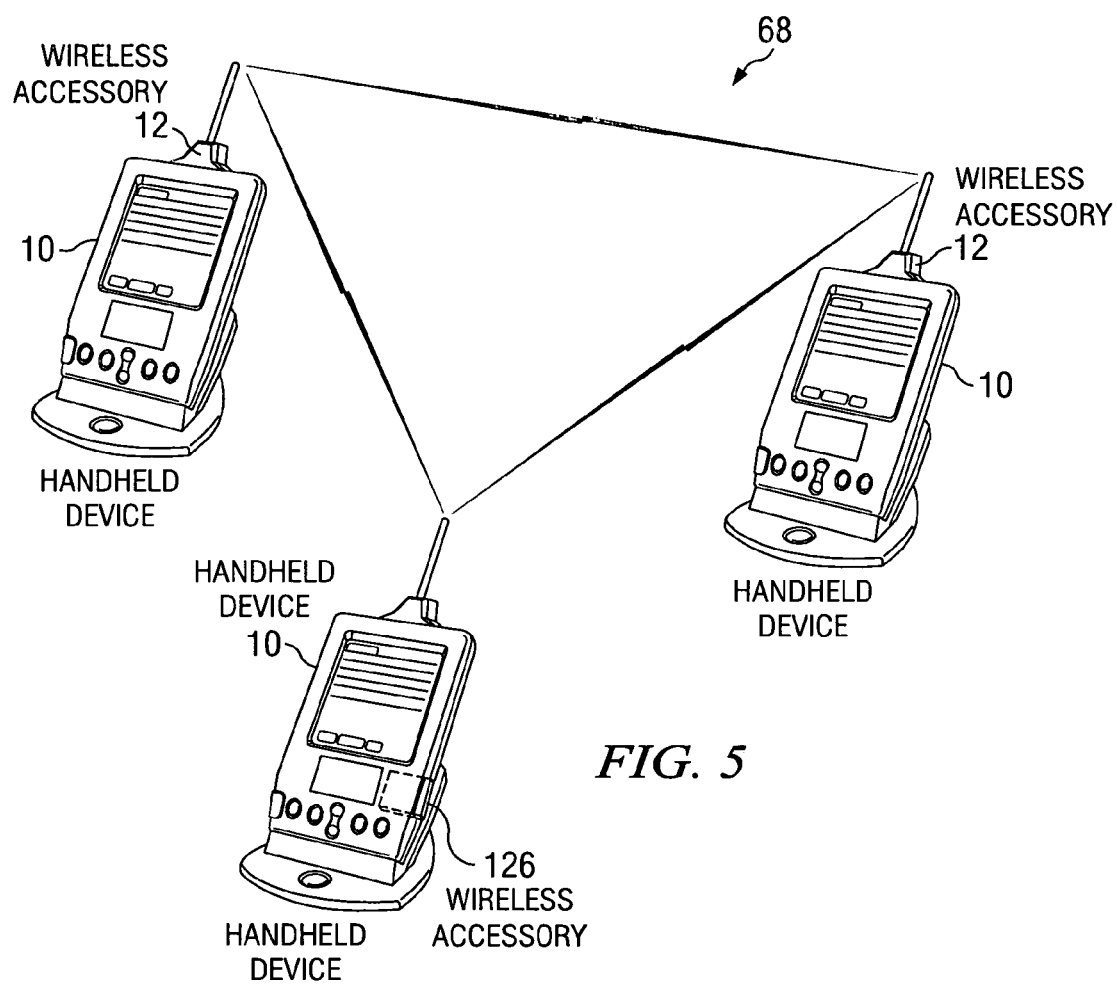
FIG. 5 illustrates a block diagram of an embodiment of the present invention using an ad hoc wireless network.

An additional embodiment of the present invention is shown in FIG. 5. In this embodiment, an ad hoc network without an access point is used. Each of the handheld devices 10 communicate over a wireless network 68. One of the devices 10 will act as the network host. The network could be a Bluetooth network, an 802.11 network or equivalent ad hoc network. For this embodiment, the wireless accessory can be as described in the previous embodiments, a memory card 126, a rechargeable battery with a memory, a memory with a wireless radio (FIG. 3), etc. The memory on the wireless accessory is loaded with data by plugging the wireless accessory into the accessory bay as described for FIGS. 1 and 3. As described above, after placing the wireless accessory on the hand held device, the contents of the memory in the wireless accessory is not accessible from the Handheld Device until a wireless command is received enabling access. In order to access the contents, a wireless command is sent from one of the devices 10, such as the teachers device to activate access to the memory stored on the wireless accessory memory. In some embodiments this is achieved by having the contents encrypted and sending a key from the teachers device. The portable computer device can then use the key to decrypt the data and present the lesson plan, test question, etc. to the user.

Depending on the use scenario, very low data rates (i.e. lower cost transmitters and receivers) may be sufficient although the "perceived" data rate may be very high. For instance, if the lesson plan already resides on the wireless accessory, the teacher only needs to send a 1 byte command to the units to activate a particular program, data set, etc. stored in the clip-on. The perception would be that the data was sent from the teacher when, in fact, it was simply hidden from view until the teacher wanted it to be seen. A teacher-push or student-pull model could easily be supported.

In several use scenarios, the teacher can control the network without ever having to be at the workstation. Since lesson plans can be loaded to the units prior to class, teachers have more time to roam during class time. In addition, one wireless accessory can be designated as a teacher-control unit. The teacher-control unit can send simple, 1 byte, commands to the class to activate chosen programs, data sets, etc. already stored in the students' units. The teacher would still need to use the workstation for some activities, but memory in the clip-ons reduces the amount of time needed at the workstation during class.

OTHER EMBODIMENTS

Although the present invention has been described in detail, it should be understood that various changes, substitutions, and alterations could be made hereto without departing from the spirit and scope of the invention as defined by the appended claims.

The features that are the subject of the present invention could be incorporated into other into other computer based teaching tools and computers. Similarly, other embodiments include the same user interface functionality in a ROM software application package that is executed on a computer, graphing calculator or other handheld device.

What is claimed is:

1. A system for loading data on a portable computer device comprising:
   a. a computer having data to be loaded into the portable computer device;
   b. a wireless accessory which is connectable to the portable computer device;
   c. an accessory bay for loading data from the computer into the wireless accessory over a wired connection when the wireless accessory is plugged into the accessory bay;
   d. wherein the wireless accessory provides data to the portable computer device when it is plugged into the portable computer device after having data loaded previously into the wireless accessory when plugged into the accessory bay, and
   e. a wireless access point connected to the computer to communicate over a wireless link to the portable computer device,
   wherein the data is made available to the portable computer only after receiving a signal from the computer over the wireless link indicating to release access to the data already stored on the wireless accessory to the portable computer, wherein the data is made available to the portable computer only after receiving an encryption code matching the data stored on the wireless accessory, wherein the wireless accessory comprises a memory, and wherein the wireless accessory further comprises:
   a rechargeable battery.

2. A system for loading data on a portable computer device comprising:
   a. a computer having data to be loaded into the portable computer device;
   b. a wireless accessory which is connectable to the portable computer device;
   c. an accessory bay for loading data from the computer into the wireless accessory over a wired connection when the wireless accessory is plugged into the accessory bay;
   d. wherein the wireless accessory provides data to the portable computer device when it is plugged into the portable computer device after having data loaded previously into the wireless accessory when plugged into the accessory bay, and
   e. a wireless access point connected to the computer to communicate over a wireless link to the portable computer device,
   wherein the data is made available to the portable computer only after receiving a signal from the computer over the wireless link indicating to release access to the data already stored on the wireless accessory to the portable computer, wherein the data is made available to the portable computer only after receiving an encryption code matching the data stored on the wireless accessory, wherein the wireless accessory comprises a memory, and wherein the wireless accessory further comprises:
   a. a microprocessor to control the activity of the wireless accessory;
   b. a rechargeable battery; and
   c. a wireless communications radio.

3. The system of claim 2 wherein the accessory bay comprises:
   a. an interface to communicate with the computer over a wired link;
   b. a micro-controller to control the data over the interface from the computer; and
   c. a data bus for storing data on a wireless accessory connected to a plug-in slot on the accessory bay.

4. The system of claim 3 wherein the accessory bay further comprises a power circuit for recharging the rechargeable battery of the wireless accessory when plugged into the accessory bay.

5. A wireless accessory for loading data from a computer into a portable computer device comprising:
   a. a data bus for connection to an accessory bay for receiving data;
   b. a memory;
   c. a processor for controlling data storage into the memory over the wired connection; and
   d. wherein the wireless accessory provides data to the portable computer device when it is plugged into the portable computer device after having data loaded previously into the wireless accessory when plugged into the accessory bay, wherein the data is made available to the portable computer only after receiving a signal from the computer over the wireless link indicating to release access to the data already stored on the wireless accessory to the portable computer, wherein the data is made available to the portable computer only after receiving an encryption code matching the data stored on the wireless accessory, and wherein the wireless accessory further comprises: a rechargeable battery.

6. The wireless accessory of claim 5, wherein the wireless accessory further comprises:
   a wireless communications radio.

7. The system of claim 5, wherein the wireless accessory further comprises a rechargeable battery.

8. The system of claim 7, wherein the wireless accessory further comprises a wireless communications radio.

9. A system for loading data on a portable computer device comprising:
   a. a computer having data to be loaded into the portable computer device;
   b. a wireless accessory which is connectable to the portable computer device;
   c. an accessory bay for loading data from the computer into the wireless accessory over a wired connection when the wireless accessory is plugged into the accessory bay; and
   d. wherein the wireless accessory provides data to the portable computer device when it is plugged into the portable computer device after having data loaded previously into the wireless accessory when plugged into the accessory bay, and wherein the wireless accessory comprises:
   a. a memory; and
   b. a rechargeable battery.

10. The system of claim 9, further comprising a. a microprocessor to control the activity of the wireless accessory; and b. a wireless communications radio.

11. The system of claim 10, wherein the accessory bay comprises:

a. an interface to communicate with the computer over a wired link;

b. a micro-controller to control the data over the interface from the computer; and c. a data bus for storing data on a wireless accessory connected to a plug-in slot on the accessory bay.

12. The system of claim 11, wherein the accessory bay further comprises a power circuit for recharging the rechargeable battery of the wireless accessory when plugged into the accessory bay.

* * * * *